(12) United States Patent
de Souza et al.

(10) Patent No.: US 7,689,926 B2
(45) Date of Patent: Mar. 30, 2010

(54) SELECTIVE WINDOW EXCLUSION FOR CAPTURED CONTENT

(75) Inventors: Jeremy de Souza, Redmond, WA (US); Pravin K. Santiago, Issaquah, WA (US); Stephen H. Wright, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 207 days.

(21) Appl. No.: 11/395,077

(22) Filed: Mar. 31, 2006

(65) Prior Publication Data

US 2007/0234212 A1     Oct. 4, 2007

(51) Int. Cl.
    G06F 3/048     (2006.01)
(52) U.S. Cl. ............................ 715/781; 715/788
(58) Field of Classification Search .............. 715/786, 715/787, 833, 855, 757, 766, 790–794, 796, 715/800, 838, 859
    See application file for complete search history.

(56) References Cited

U.S. PATENT DOCUMENTS

| 5,513,306 | A | * | 4/1996 | Mills et al. ................. 715/853 |
| 6,590,583 | B2 | | 7/2003 | Soohoo |
| 6,633,305 | B1 | | 10/2003 | Sarfeld |
| 6,924,822 | B2 | | 8/2005 | Card et al. |
| 6,958,759 | B2 | * | 10/2005 | Safadi et al. ................. 715/810 |
| 7,075,512 | B1 | * | 7/2006 | Fabre et al. ................. 715/800 |
| 2007/0013722 | A1 | * | 1/2007 | Souza ......................... 345/660 |

FOREIGN PATENT DOCUMENTS

KR     1020030080508     10/2003

* cited by examiner

*Primary Examiner*—Weilun Lo
*Assistant Examiner*—Truc T Chuong
(74) *Attorney, Agent, or Firm*—Workman Nydegger

(57) ABSTRACT

Described is the selective exclusion of content returned in a requested screen capture operation, wherein exclusion may be determined by a window category and the requesting application program. For example, a magnification program will not received content captured from its own layered window or from any other layered magnification windows. A registration mechanism obtains and maintains a window handle for any window registered for exclusion. A screen capture mechanism uses the information to determine whether to exclude the content of windows when returning the captured screen content. Exclusion may be accomplished by enumerating areas that are not covered by any layered window and copying those areas to a screen representation buffer or the like, and separately enumerating areas that are covered by at least one layered window. A covered area is only copied to the screen representation when it does not correspond to an excluded window.

18 Claims, 5 Drawing Sheets

SELECTIVE WINDOW EXCLUSION FOR CAPTURED CONTENT

BACKGROUND

Contemporary computer systems offer users the ability to magnify a portion of their display screen, typically for providing visually-impaired users with better accessibility to computers, although also offering mainstream users the benefit of magnification in certain contexts. In general, when the user runs a magnifier, a magnification window is opened and the magnified content displayed in that window. Often the user can adjust the magnification window in size and position, adjust the magnification level, and possibly choose other effects, e.g., color inversion.

Screen magnifiers are generally built to operate in one or more various modes. In a full-screen magnifier mode, the magnifier window occupies the entire screen, and the program magnifies a subset of the underlying content, typically depending on where the pointer indicator/cursor is located. A fixed mode provides a less-than-full screen window that is fixed on the screen, and typically magnifies some appropriate area that surrounds the pointer indicator/cursor. In a floating lens mode, the magnification window moves with the pointer indicator/cursor. With some magnification programs, a user may change between modes.

Previous magnification programs worked by inserting a driver in the video path above the main display driver to intercept graphics primitives, processing the primitives to build an off screen model to magnify the screen content, and then outputting the magnified screen content to the screen. An recent accessibility technology that provides an alternative to (or a complement to) driver-based magnifiers is described in U.S. patent application Ser. No. 11/180,859, filed Jul. 12, 2005, assigned to the assignee of the present invention and hereby incorporated by reference. This technology is (among its aspects) generally directed towards a magnification engine and API (application programming interface) that magnifier applications can leverage, and that renders a magnifier in software and/or hardware.

As can be readily appreciated, some magnifier modes such as full-screen mode and floating lens mode require the ability to capture and magnify screen content that is under the magnifier window. However, this leads to a problem, in that if the magnifier window magnifies itself, that is, magnifies already magnified content, recursive magnification will occur.

With the magnification engine and API solution, magnification is implemented via a special type of window referred to as a layered window. As a result, recursive magnification can be avoided by excluding layered windows from the screen content that is provided to the magnifier application program. However, excluding layered windows results in all windows that are marked layered as being excluded, including those that are not magnifier windows. This causes a problem, because other components make use of layered window technology, e.g., to output screen content including transparent/semi-opaque UI elements such as tooltips and user interface elements in recent application programs (e.g., Microsoft Corporation's Visual Studio® and Office 12 products). Depending on the mode of the magnifier, the result of the layered window exclusion is that these non-magnifier windows become invisible to an end-user, because as layered windows, their rendered output is not provided to the magnification program.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards an exclusion mechanism that selectively controls whether the content of any window may be captured by a given application program, as determined by a category of that window. A registration mechanism obtains and maintains information (e.g., a window handle, or HWND) for any window that is registered as belonging to an exclusion category. A screen capture mechanism determines whether captured screen content should exclude each window of the exclusion category, and if so, employs an exclusion mechanism to selectively capture screen content by copying screen content corresponding to windows that do not belong to the exclusion category.

In one example, upon receiving a registration request to register a window, the window is registered along with any similarly registered window or windows of the same category. When a request to capture screen content is received from a registered window, the content of each registered window is excluded from the captured screen content that is returned in response to the screen capture request.

Thus, by maintaining data that identifies each window of a layered magnifier window category, for example, any receiving a request to capture screen content from a magnifier window (program) receives captured screen content that excludes layered magnification windows. For example, this may be accomplished by enumerating areas that are not covered by any layered window and copying those first areas to a screen representation buffer or the like, and enumerating areas that are covered by at least one layered window. A covered area is only copied to the screen representation when it does not correspond to an excluded window. The copied screen representation is then returned without including the screen content of excluded windows.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
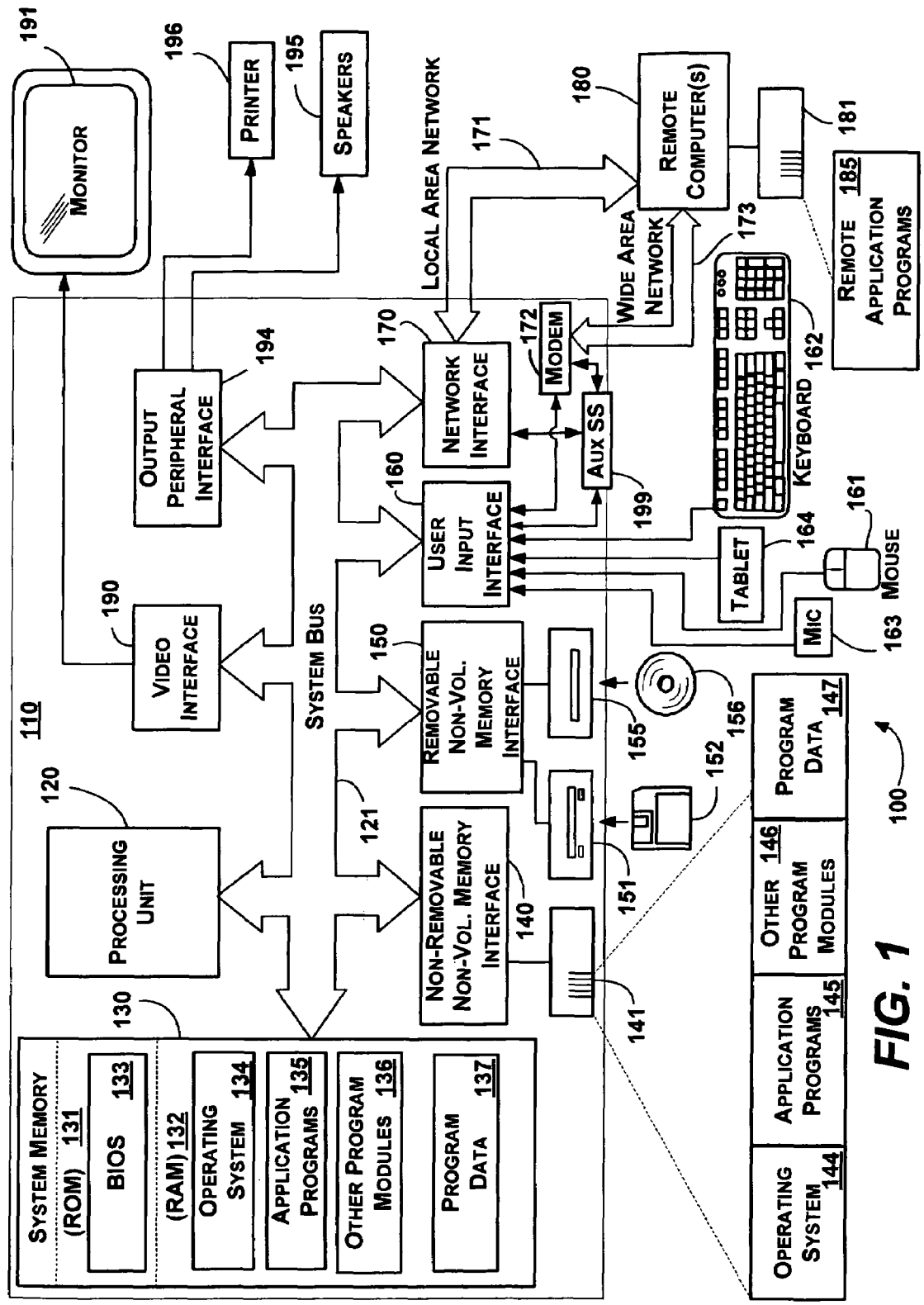
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

An auxiliary display subsystem 199 may be connected via the user interface 160 to allow data such as program content, system status and event notifications to be provided to the user, even if the main portions of the computer system are in a low power state. The auxiliary display subsystem 199 may be connected to the modem 172 and/or network interface 170 to allow communication between these systems while the main processing unit 120 is in a low power state.

Selective Window Exclusion for Captured Content

Various aspects of the technology described herein are directed towards a technology that avoids recursive magnification problems and does so without excluding the content of non-magnifier windows from the screen content that is magnified. In general, this is accomplished via a mechanism/process that excludes non-magnifier windows from having their content returned for magnification, but not other layered windows.

In one example implementation described herein, selective exclusion is described in the example context of a Windows®-based operating system architecture. However, as will be understood, the present invention is not limited to Windows®-based operating systems, let alone any particular implementation or examples described herein. Instead, numerous ways to implement the present invention are feasible.

Further, instead of or in addition to excluding magnifier windows, for example, the mechanism described herein may selectively exclude essentially any one window or category of window types from having its content seen by another window or windows. Thus, the mechanism may granularly exclude one or more windows, for example to prevent as little as one window from seeing the content corresponding to as little as one other window, or alternatively may work with broad categories. As such, the present invention is not limited to any of the particular examples used herein, but rather may be used various ways that provide benefits and advantages in computing in general.

In a Windows®-based environment, layered windows including magnifier windows are marked with a WS_EX_LAYERED window style. To this end, the magnifier application 310 calls CreateWindowEx, and sets its window to be layered, which are typical operations for a layered window.

Figure 2:
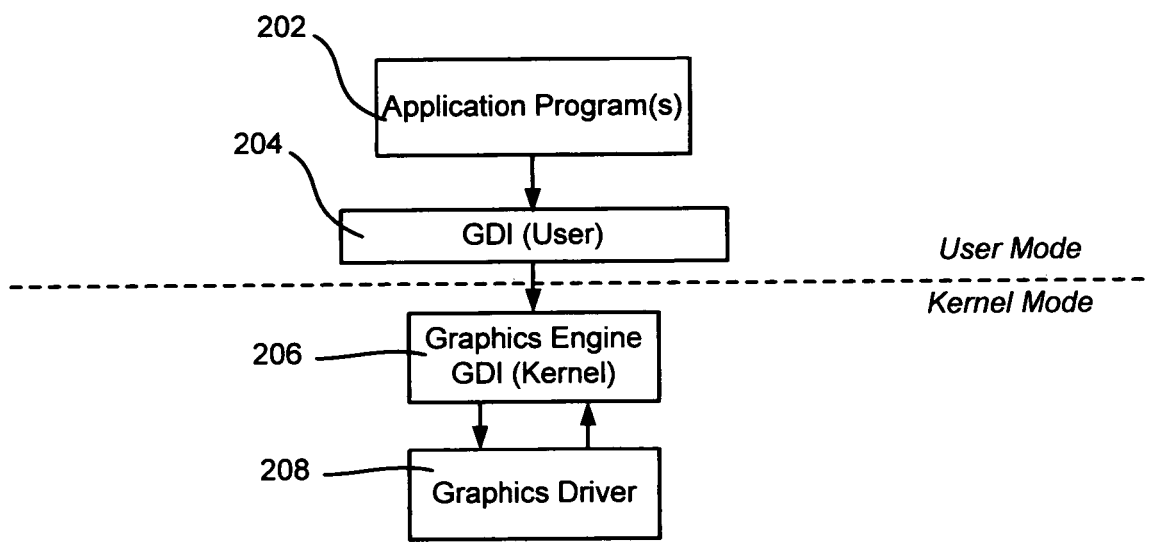
FIG. 2 is a block diagram representing an example architecture and a flow of information among components including from a program to a display (or printer) device driver to output information.

In such an environment, the screen contents may be captured by having the magnifier program initiate a GetDC(null) function call to GDI (the graphics device interface of Microsoft® Windows®), where a GetDC function retrieves a handle to a display device context (DC) for the client area of a specified window or for the entire screen. The returned handle may be used with subsequent GDI functions to draw in the device context. More particularly, as represented in FIG. 2, GDI is an intermediary support between a Windows®-based graphics driver and application programs. In general, a user mode program 202 (and other programs) may call Win32 GDI functions 204 to make graphics output requests, whereby these requests are provided to a kernel-mode GDI engine 206.

In turn, the kernel-mode GDI engine 206 sends these requests to an appropriate graphics driver 208, such as a display driver (or printer driver). In general, GDI communicates with the graphics driver through a set of graphics device driver interface (graphics DDI) functions, which may be identified by their Drv prefix; (the driver supports certain DrvXxx functions for GDI to call). Information is passed between the GDI engine 206 and the driver through appropriate input/output parameters. The driver 208 supports the GDI engine's requests by performing the appropriate operations on its associated hardware before returning to the GDI engine 206.

To capture the screen contents, following the above-described GetDC(null) function call, the application program 202 requests a BitBLT( ) to obtains the relevant portion of the screen to be magnified. The BitBlt function performs a bit-block transfer of the color data corresponding to a rectangle of pixels from the specified source device context into a destination device context. As described above, such calls to BitBlt( ) with a conventional CAPTUREBLT rop (raster op) code may include all layered windows including the magnifier window, however this would case cause recursive magnification in full-screen or floating magnifier modes since the magnifier would get its own screen content.

Figure 3:
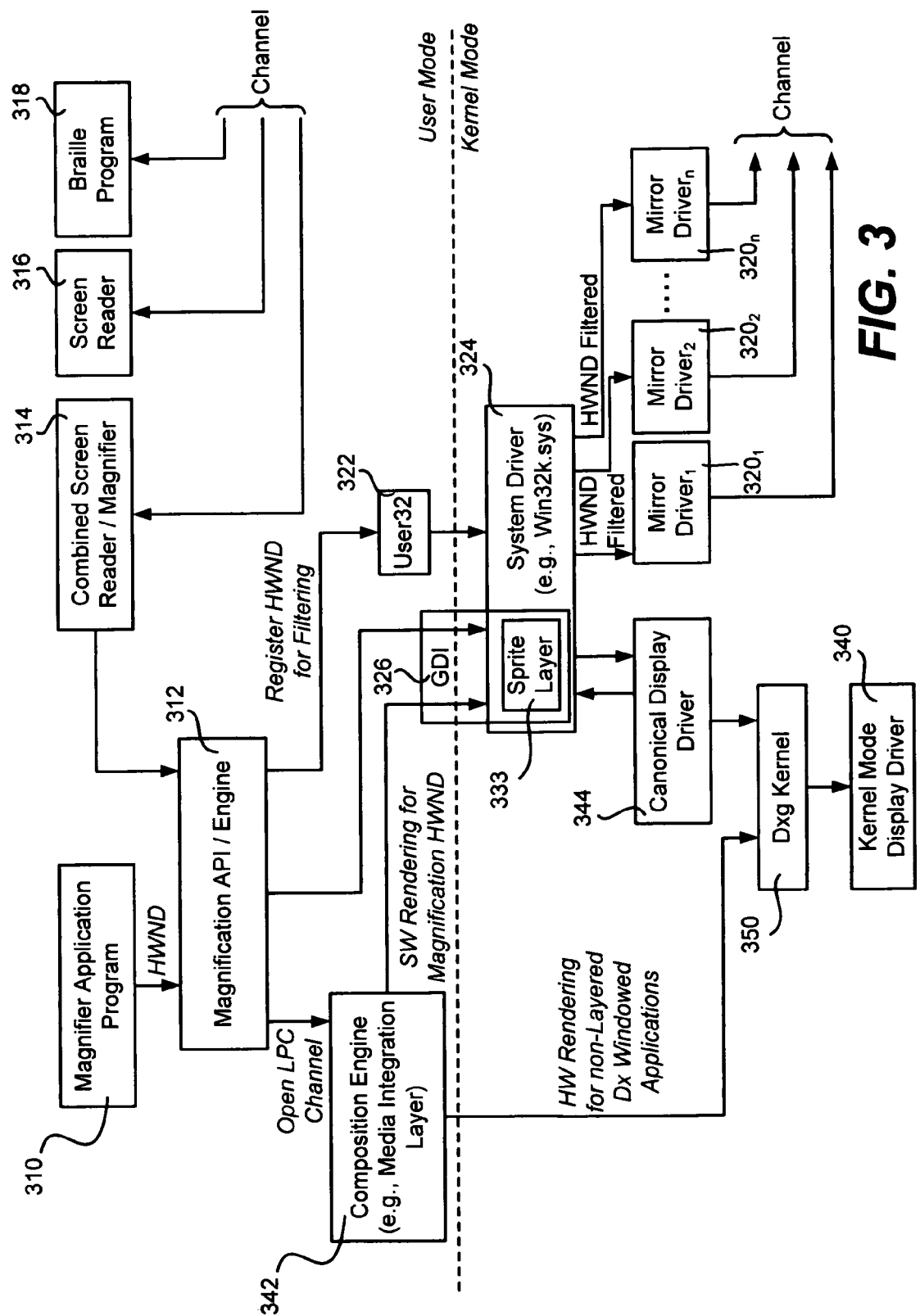
FIG. 3 is a block diagram representing an example architecture for selective exclusion of screen content returned to magnification programs.

FIG. 3 shows a more specific architecture in which accessibility-related programs such as magnifiers may operate as user mode programs. For example, a magnifier application program 310 is shown as using the magnification API/engine 312 to provide its magnification functionality. Other user mode programs shown for completeness may include programs such as a combined screen reader/magnifier program 314, a screen reader program 316, a Braille program 318 and/or other such programs. While these example programs are represented in FIG. 3, it is understood that this is only an example, and a typical user may have anywhere from one to any practical number of such programs operating.

Note that in the example of FIG. 3, it is shown that the combined screen reader/magnifier 314 uses the magnification API/engine 314, as well as accessibility mirror driver technology, such as via the mirror driver$_1$ 320$_1$. The other user mode programs 316 and 318 likewise use mirror drivers (e.g., 320$_2$-320$_n$). Mirror drivers are described in copending United States patent application entitled "Selective Rendering for Driver Classes," assigned to the assignee of the present invention, filed concurrently herewith, and hereby incorporated by reference.

With respect to magnifier exclusion for programs that use the magnification API/engine 312 in the example represented in FIG. 3, consider an exclusion mechanism for the magnifier application 310. To use the API, the magnifier application 310 passes the HWND of the magnification window to the magnification API/engine 312. In turn, the magnification API/engine 210 registers the HWND for the magnifier window to enable exclusion of this category of windows, such as via a function (e.g., SetMagnifierWindow) exposed privately via a User32 component 322 (e.g., User32p.lib). For example, in this example implementation, magnifier windows created using the magnification API 312 are automatically registered with the system driver 324 (Win32k.sys), e.g., via User32p.lib SetMirrorRendering APIs. Note that the HWND registration information may be provided to the system driver 324, to the GDI components 326 (shown as a single block 326 in FIG. 3 to represent the user mode and kernel components), or to both. The HWND may be separately registered for the magnification window of each such magnification program, for example when it first calls the magnification API/engine 312, however it is feasible to have a registration mechanism that allows multiple magnification windows to be registered at the same time. Note that once registered, the exclusion of magnification windows when magnifying layered windows persists through display mode changes, but otherwise may be specifically de-registered, (and is also turned off if an HWND is closed since the system may reuse HWNDs).

To avoid the recursive magnification problem while not also filtering out layered windows that the magnifier wants to see, the technology herein excludes any legitimately-registered magnification window (or windows), but not all layered windows. In other words, non-layered windows are seen, along with any layered windows that are not registered as magnification-type layered windows. As described above, the magnification API 312 automatically handles the registration process, whereby the magnifier application program 310 only need provide its HWND to the magnification API/engine 312, (or receive an HWND from it in response to another call). It is feasible to have alternative models such as one in which the application program 310 directly registers itself via the user32 code 322 and/or via the GDI interface 326.

With respect to excluding the content of registered windows, the CAPTUREBLT rop code may be modified such that screen-capture callers will received a full set of non-layered and layered windows, other than a specifically excluded window or specifically excluded category of windows. Note that instead of modifying the CAPTUREBLT rop code, it is equivalent to define one or more new rop codes, however for purposes of simplicity a modified CAPTUREBLT rop code will be described.

Thus, in one example implementation, filtering is accomplished by defining a category of windows that correspond to magnifier windows, and excluding those windows (e.g., via their window handles, or HWNDs) from the output of a CAPTUREBLT operation.

With respect to filtering operations, once the specific layered magnifier HWND or HWNDs are registered for exclusion, content corresponding to that set of one or more HWNDs can be identified and excluded from return. Essentially any way of tracking a registered category of windows (e.g., magnifiers) with their corresponding HWNDs may be used, such as by maintaining a table or similar data structure. Note that in one implementation, all magnifiers that use the API 312 are registered and categorized together, such that no magnifier window will receive the content of any magnifier window, including its own content.

Rendering paths are also represented in FIG. 3, including alternative rendering paths from the magnification API/engine 312 to the kernel mode display driver 340 that may be used. In general, the magnification API/engine 312 checks to see if it can open the graphics stream, which is essentially an LPC channel to the media integration layer (MIL) composition engine 342. If a connection to the graphics stream cannot be opened, magnification is implemented via the Win32k.sys system driver 324 (e.g., via GetDC(null) and StretchBlt).

If a connection to the graphics stream can be opened, magnification is implemented using the composition engine 342 in either software or hardware rendering mode. More particularly, hardware rendering may occur when the magnifier window is not a layered window and other hardware requirements to compose in hardware are met. If so, the magnifier window will be rendered in hardware as a windowed Dx application. The composition engine 342 uses DxgKernel interfaces 350 to draw to the kernel mode display driver 340.

Software rendering is instead used by the composition engine 342 when the magnifier window is a layered window or other hardware requirements to compose in hardware are not met. In such a situation, the magnifier window is rendered in software to a surface which is composited by the GDI sprite layer 333 in the system driver (e.g., Win32k.sys).

In a situation where a connection to the graphics stream cannot be opened, the system driver (e.g., Win32k.sys) 324 calls DrvXXX functions implemented by a canonical display driver (CDD) 344. The canonical display driver 344 essentially implements a Windows® XP-type device driver interface, calls GDI support services in the system driver (Win32k.sys) 332 to render, and then draws to the display driver 340 via DxgKernel 350. Note that the canonical display driver 344, DxgKernel 350 and the display driver 340 are a secure path. Further note that the canonical display driver 344 essentially insulates other (e.g., Windows® Vista™-type) driver model display drivers from having to implement the Windows® XP-type device driver interface, and eliminate the need to avoid modifying Win32k.sys to work with a Dx interface, which other (e.g., Windows® Vista™-type) driver model display drivers support.

A sprite range is a data structure inside the GDI 326 that keeps track of z-order, and contains a complete spatial representation of sprite underlays (the area under a sprite/layered window) and sprites. The GDI 326 copies areas not covered by a sprite to the destination device context. The GDI then copies the sprite underlays to the destination device context. Note that if the CAPTUREBLT rop code is not used when copying bits from the screen to a destination bitmap, the GDI 326 references the sprite ranges to draw the uncovered areas and sprite underlays. The effective result is that bits copied do not reflect the presence of any layered windows.

Alternatively, using CAPTUREBLT when copying bits from the screen to a destination bitmap is a sprite-aware capture, and, using the technology herein, this operation is also aware of registered category of windows. In this example, the capture is aware of magnifier windows.

To capture, another copy of the screen is created. The GDI 326 draws any uncovered screen regions to the copy of the screen, that is, draws areas not covered by layered windows/sprites. Areas that are covered by sprites are treated differently by filtering out any sprites associated with registered magnifiers.

Figure 5:
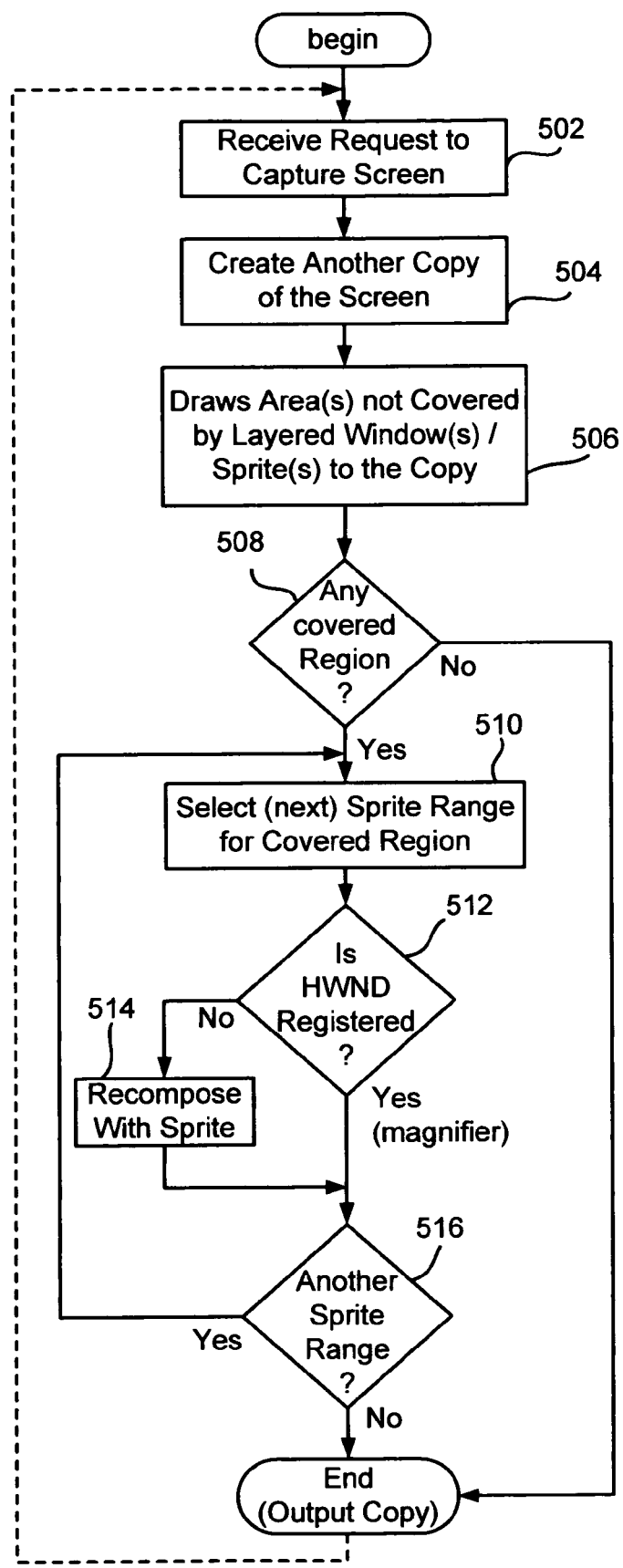
FIG. 5 is a flow diagram representing example steps to exclude a certain category of windows from having their windows' content be captured by another window.

To filter out magnifier sprites, GDI enumerates the sprite ranges for the covered regions and recomposes the region sprites with the registered HWNDs ignored. FIG. 5 generally describes one process for such exclusion.

Figure 4:
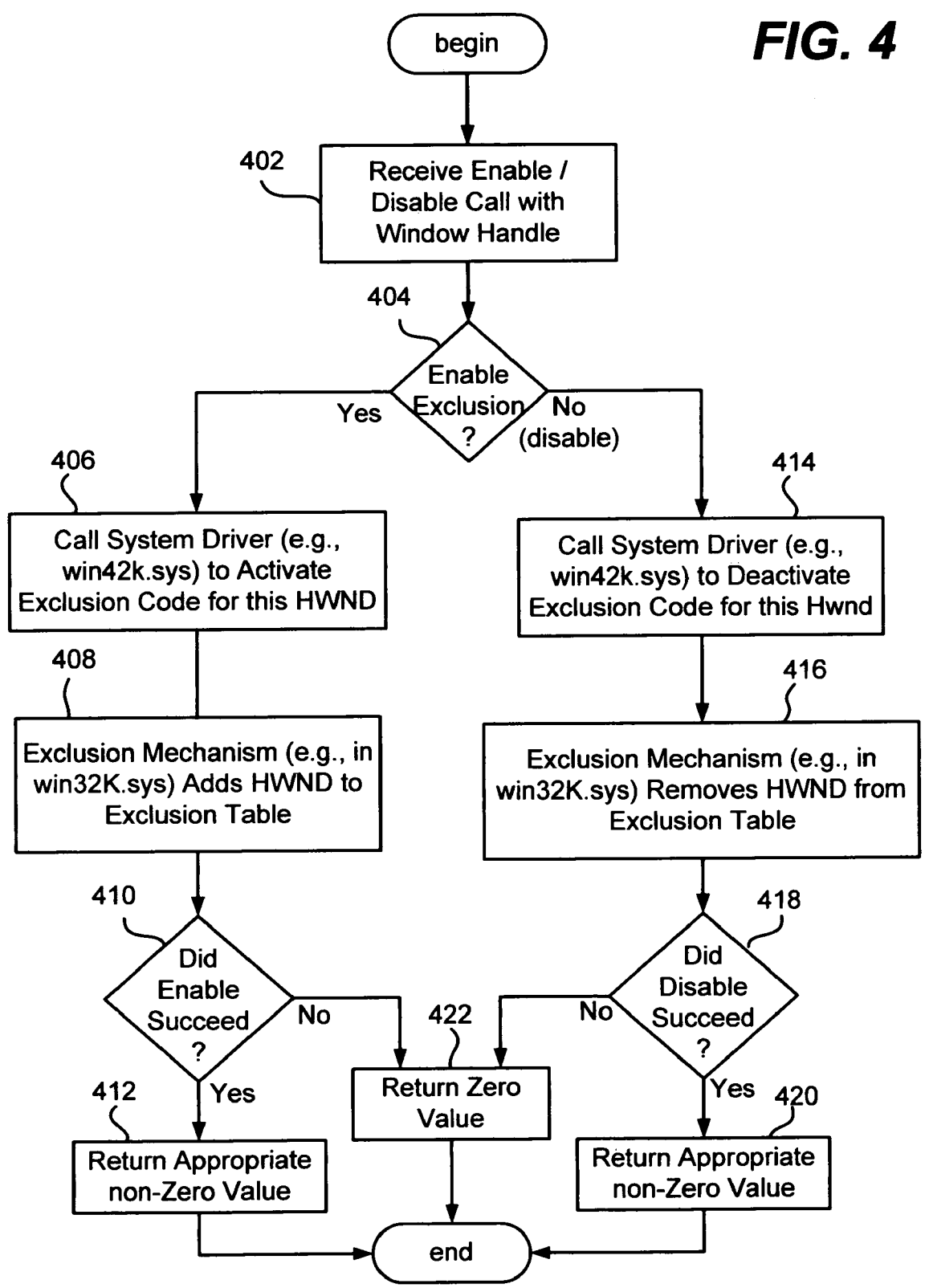
FIG. 4 is a flow diagram representing example steps to register a magnifier window for exclusion.

FIG. 4 summarizes example steps in the registration process, beginning at step 402 where a request to enable or disable a window is received, along with the HWND for that window, e.g., via a SetMagnifierWindow function. If the parameter is set to enable filtering, step 404 branches to steps 406 and 408 to add the HWND to the table to associate the HWND with one or more drivers that are to have primitives filtered out. Step 410 and steps 412 or 422 are executed, depending on the success or failure of the registration. For example, in one implementation, if the function succeeds, the return value is nonzero, while if the function fails, the return value is zero (step 422). In this example, the function fails if the HWND references a window that is not marked with the layered window style, and/or if the HWND references a non top-level window such as a child window (which in this implementation automatically meets the previous condition since non top-level windows cannot be marked as layered windows).

Steps 414, 416, 418 and 422 represent the disabling operation, which is essentially similar. One additional error may be an attempt to de-register an HWND that was not registered.

FIG. 4 thus provides a straightforward mechanism for associating HWNDs with an exclusion category, as well as disassociating them. Note that more granular filtering can, for example, allow a parameter to be passed down that associates the HWND with a particular class or classes of drivers (e.g., of among possibly many different types) for filtering purposes. Further note that it is feasible to have a filtering model based on inclusion instead of exclusion, e.g., a driver only receives screen content corresponding to types for which an application window specifically registers.

FIG. 5 summarizes example steps in the exclusion process, beginning at step 502 where a screen capture request is received that corresponds to a magnifier request. Step 504 represents creating another copy of the screen and drawing the areas that are not covered by layered windows or sprites to that copy.

Step 508 determines whether any covered region needs to be drawn, and if not, the screen copy process is ended. If there is a covered region, steps 510-516 represent the enumeration and filtering process, with step 512 excluding magnifiers by passing step 514 for any registered HWND. Step 516 repeats the filtered composition process until the copy is drawn with the content of any registered windows excluded. The dashed line in FIG. 5 represents the filtering process being repeated for subsequent HWND's screen capture operations.

While the above examples primarily focused on selective filtering for magnification purposes and the like, it should be noted that selective filtering for other applications may also be used. For example, for security purposes, certain windows may be prevented via filtering (e.g., particularly via inclusion filtering, i.e., only an included window can capture another window) from capturing the content of another window. Screen capture a window's content can be made more difficult by this mechanism.

Further, other types of windows may benefit from such exclusion. By way of example, consider a mostly-transparent layered window that changes the color and/or contrast of other windows, such as to help a visually impaired user view content. By registering itself as a magnifier, regardless of whether it actually magnifies, the layered window will not change the color and/or contrast of other magnifiers, and vice-versa. This would be beneficial when other magnifiers and the like have their own color/contrast settings that incorrectly appear when shown in conjunction with the layered color/contrast window.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for avoiding recursive magnification problems and without excluding content of non-magnifier windows from screen content that is magnified, the method comprising:
    maintaining data that identifies whether each window of a plurality of windows corresponds to a set of at least two properties, including a layered property and a magnification-type property, wherein at least one of the plurality of windows is identified as corresponding to both the layered property and the magnification-type property;
    receiving a request to capture an area of screen content; and
    after maintaining data identifying the at least one of the plurality of windows as corresponding to both the layered property and the magnification-type property, and after receiving the request to capture screen content, returning screen content in a magnification program, the screen content returned to the magnification program:
        excluding all content of the one or more windows corresponding to both the layered property and the magnification-type property, as stored in the maintained data;
        including all content from the area that is within any windows of the plurality of windows that correspond to only the layered property; and
        including all content from that area that is within any windows of the plurality of windows that correspond to neither the layered property, nor the magnification type property.

2. The method of claim 1 wherein the at least one window corresponds to a layered window of an accessibility program, and wherein maintaining the data comprises maintaining a window handle for the layered window of the accessibility program.

3. The method of claim 1 wherein the at least one window corresponds to a layered window of a magnifier program, and wherein maintaining the data comprises maintaining a window handle for the layered window of the magnifier program.

4. The method of claim 1 wherein the at least one window corresponds to a set of windows that includes layered magnification-type windows, including a layered window of a first magnifier program and a layered window for each of at least one other magnifier program, wherein receiving the request to capture an area of screen content comprises receiving the request from the first magnifier program, and wherein returning the screen content comprises excluding the content of each layered window of the first magnifier program and each of the at least one other magnifier programs.

5. The method of claim 1 wherein maintaining the data comprises receiving a registration request that identifies windows via a window handle.

6. The method of claim 1 wherein returning the screen content comprises, enumerating first areas that are not covered by any layered window, copying those first areas to a screen representation, enumerating second areas that are covered by at least one layered window, copying those second areas to the screen representation only when those areas do not correspond to a magnification-type window, and returning the copied screen representation.

7. In a computing environment, a system comprising:
   a registration mechanism that maintains information comprising an identifier of at least one window that is registered as belonging to an exclusion category corresponding to windows having a category combination that includes:
      a magnification-type category; and
      a layered category;
   a screen capture mechanism that determines whether a request to capture screen content is to exclude each window of the exclusion category corresponding to windows having both a magnification-type category and a layered category; and
   an exclusion mechanism that selectively copies screen content for capture by copying screen content corresponding to windows that do not belong to the exclusion category, such that the exclusion mechanism:
   selectively excludes screen content for windows corresponding to both the magnification-type type property and the layered category;
   selectively copies screen content for windows corresponding to only the layered category; and
   selectively copies screen content for windows corresponding to neither the magnification type category nor the layered category.

8. The system of claim 7 wherein at least one window corresponding to the layered and magnification-type categories corresponds to a magnification program that magnifies a full screen of a display device.

9. The system of claim 7 wherein at least window corresponding to the layered and magnification-type categories corresponds to a window of a magnification program that moves automatically with a screen pointer/cursor position.

10. The system of claim 7 wherein at least one of the windows that do not belong to the exclusion category comprise layered transparent and/or semi-opaque user interface elements.

11. The system of claim 7 wherein each identifier comprises a window handle.

12. The system of claim 7 wherein the exclusion mechanism is incorporated into a kernel mode component.

13. A computer-readable storage medium having stored thereon computer-executable instructions, which when executed by a processor, perform a method for avoiding recursive magnification problems and without excluding content of non-magnifier windows from screen content that is magnified, the method comprising:
   receiving a registration request to register a first window;
   registering the first window, including maintaining information about the registered first window, including information regarding the first window being categorized as a magnification-type layered window;
   receiving a registration request to register a second window;
   registering the second window, including maintaining information about the registered second window, including information regarding the second window being categorized as a layered window, but not being a magnification-type layered window;
   identifying a third window, wherein the third window is not registered as any type of layered window;
   receiving a request to capture screen content with a full-screen magnification program, the full-screen magnification program being adapted to content of windows positioned within the screen of a display device;
   when the request to capture screen content is received, and that corresponds to the full screen, making a determination from the information as to whether the first window, second window, and third window include content for display within the magnification program, wherein making the determination includes:
      for the second window registered as a layered window not corresponding to a magnification-type layered window, including content of the second window in the screen content capture;
      for the third window not registered as any type of layered window, including content of the third window in the screen content capture; and
      for the first window registered as a magnification-type layered window, excluding all content of the first window from the screen content capture, such that the full-screen magnification program excludes content from all, and only all, windows registered as magnification-type layered windows; and
   within the full-screen magnification program, displaying all content included in the screen content capture, and abstaining from displaying all content excluded from the screen content capture.

14. The computer-readable storage medium of claim 13 having further computer-executable instructions comprising, receiving a request to de-register the first window, and in response, de-registering the first window.

15. The computer-readable storage medium of claim 13 wherein the registration request for the first window is received via a magnification API call.

16. The computer-readable storage medium of claim 13 wherein the registered first window and any other similarly registered magnification-type layered window or windows correspond to a category of layered magnifier program windows.

17. The computer-readable storage medium of claim 16 wherein the category corresponds to a set of at least two layered windows, wherein the first window is contained in the set, and wherein returning the screen content comprises excluding the content of each magnification-type layered window of the category.

18. The computer-readable storage medium of claim 13 wherein displaying the content comprises, enumerating first areas that are not covered by any layered window, copying those first areas to a screen representation, enumerating second areas that are covered by at least one layered window, copying those second areas to the screen representation only when those areas do not correspond to a registered magnification-type layered window, and returning the copied screen representation.

* * * * *